United States Patent Office 3,046,221
Patented July 24, 1962

3,046,221
THERMALLY STABLE ATTAPULGITE-BASE DRILLING MUD
Charles G. Dodd, Norman, Okla., assignor to The Pure Oil Company, Chicago, Ill., a corporation of Ohio
No Drawing. Filed Dec. 22, 1958, Ser. No. 781,886
12 Claims. (Cl. 252—8.5)

This invention relates to new and improved well drilling muds and more particularly to an improved drilling mud based on an attapulgite clay.

In drilling oil and gas wells by the rotary method, a fluid drilling mud is circulated down through the drill string and returned to the surface through the annulus between the drill string and the well bore being formed. The drilling mud removes cuttings from the well which are formed by the drill bit, builds a layer on the walls of the bore to minimize loss of mud to the various formations traversed by the bore, and provides sufficient pressure on the walls of the well bore to prevent cave-in or migration of undesirable formation fluids into the well bore. Most drilling mud compositions are based upon bentonite or low-yield native clays and sometimes contain barium sulfate as a weighting filler. Bentonite and most low-yield native clays commonly used in drilling muds, however, do not hydrate satisfactorily in salt water. They form flocculent precipitates rather than the required dispersed colloids.

Attapulgite clay, sometimes known as fuller's earth, was first used in drilling muds in about 1941 to suspend rotary drill cuttings and develop gel strength and viscosity in salt water. At that time drilling had started in a number of areas where extensive subsurface beds of salt had to be penetrated by the bit. Due to the poor performance of bentonite and most low-yield native clays in salt water, attempts were made to use attapulgite clay as a base for the drilling muds. At that time, it was considered of primary importance for a drilling fluid to have thixotropic properties so that cuttings would be held in suspension even if rotary drilling were stopped. In more recent years, the trend has been to use thin, low-gel strength muds such as the low-lime-mud systems that require less pump horsepower for circulation even with flowing velocities in the turbulent range. Attapulgite clay has continued to be used in some drilling muds but its consumption is only about one tenth that of Wyoming bentonite.

Attapulgite clay is a hydrous magnesium aluminosilicate clay mineral that differs from other clay minerals primarily in the fact that it does not possess a layer-lattice type of crystal structure that makes possible the phenomenon of lattice expansion upon hydration, as observed with expandable clays such as montmorillonites or bentonites. Attapulgite clay possesses a needle-like crystal form in contrast with the flexible, flat, irregular platelet forms assumed by bentonite. Attapulgite clay does not swell upon hydration as does bentonite, although it forms a colloidal, gel-like slurry. Salt and other electrolytes added to the water in which attapulgite clay is hydrated do not prevent the attainment of colloidal gel properties, although a temporary thickening and increase in apparent viscosity has been observed when salts were added to fresh water attapulgite slurries tested in the laboratory. The needle type of crystal also is responsible for the unusually poor filtration properties and poor wall building properties of attapulgite clays. Attapulgite clay drilling muds have been made which have satisfactory water-loss additive, attapulgit clay salt water muds ditives, such as starch. In the presence of a good low-water-loss additive, attapulgite clay salt water muds possess the great advantage that they are not contaminated by any conditions encountered during drilling operations.

Starch is usually included as the low-water loss additive and performs very well in saturated salt water muds at moderate temperatures. Fermentation of the starch is inhibited by the saturated salt water. The major disadvantage of these mud compositions is that the low-water-loss additive and the clay both degrade at elevated temperatures encountered in deep drilling.

It is therefore one object of this invention to provide an improved attapulgite clay drilling mud.

Another object of this invention is to provide an improved attapulgite clay drilling mud which is stabilized against decomposition at elevated temperatures.

A feature of this invention is the provision of an improved attapulgite clay drilling mud which includes a polysaccharide low-water-loss additive and a small amount of a magnesium compound selected from the group consisting of magnesium oxide, magnesium hydroxide, and magnesium salts of weak acids.

Another feature of this invention is the provision of an improved attapulgite clay drilling mud which comprises an attapulgite clay dispersed in an oil-in-water emulsion and containing a small amount of a polysaccharide and magnesium oxide, magnesium hydroxide or a magnesium salt of a weak acid in an amount sufficient to stabilize the mud against decomposition at elevated temperatures.

Other objects and features of this invention will become apparent from time to time throughout the specification and claims as hereinafter related.

This invention is based upon my discovery that a satisfactory attapulgite clay drilling mud may be prepared by forming a slurry of an attapulgite clay in an alkaline oil-in-water emulsion phase containing a dispersing agent for the clay and a small amount of a high molecular weight, non-ionic polysaccharide in an amount sufficient to restrict the water loss to a minimum value, together with a small amount of a magnesium compound selected from the group consisting of magnesium oxide, magnesium hydroxide, and magnesium salts of weak acids in an amount sufficient to buffer and stabilize the mud against decomposition at elevated temperatures. The same composition may be prepared using a water base rather than an oil-emulsion base which will function satisfactorily as a drilling mud at moderate temperatures. However, the oil-in-water emulsion base is necessary for drilling mud compositions which are to be used at elevated temperatures.

In the formulation of a drilling mud in accordance with this invention, a slurry of attapulgite clay in water is formed using a clay concentration which may vary in the range from about 10 to 30 pounds per barrel (42 gallon barrel). The exact proportion of clay is not critical and may vary widely as previously indicated, although the preferred concentration of attapulgite clay lies in the range from about 18 to 25 pounds per barrel. The slurry is provided with about 1 to 3 pounds per barrel of a suitable dispersing agent for the clay, a satisfactory one being a crude calcium lignosulfonate sold under the trade name Kembreak. Magnesium lignosulfonate is a preferred dispersant but is not available commercially. Other dispersing agents which are satisfactory for this purpose and which may be used in approximately the same proportions are other lignosulfonates, such as sodium lignosulfonate, potassium lignosulfonate or barium lignosulfonate, tannin, quebracho, water-dispersible derivatives of lignin and lignite, yellow dextrin, etc. The water is provided with alkali, such as sodium hydroxide, potassium hydroxide, etc., in an amount sufficient to render the mud alkaline. The amount of alkali used is not critical and may vary in the range from about 1 to 10 pounds per barrel, although 3 to 7 pounds per barrel is preferred. To this mud slurry, there was added a small amount of a high-molecular-weight, non-ionic, polysaccharide as a low-water-loss additive. The amount of polysaccharide used may vary widely, as for example from about 0.5 to 8 pounds per barrel (although 2 to 4 pounds per barrel is preferred). However, sufficient polysaccharide should be used to hold the water loss to a value less than 30 ml. per 30 minutes. The polysaccharides used in this drilling mud are of a very high molecular weight, viz., of the order of 50,000 to 100,000 or higher. A preferred polysaccharide for use in the drilling muds of this invention is native dextran (also called crude or non-hydrolyzed dextran), which is especially stable at elevated temperatures. Other polysaccharides which are satisfactory for the drilling mud compositions of this invention are starches, starch derivatives, and other non-ionic high molecular weight water-soluble polymers such as hydroxyethyl cellulose, and hydroxyethyl carboxymethyl cellulose. To this slurry, there is also added an amount of a magnesium compound which is basic in solution sufficient to buffer the composition and stabilize the attapulgite clay against decomposition at elevated temperatures. The amount of the magnesium compound used is not extremely critical and may vary from 5 to 20 pounds per barrel, although 8 to 12 pounds per barrel are preferred. The magnesium compound used is preferably one which is difficultly soluble in water, although more soluble compounds can be used. Magnesium oxide or magnesium hydroxide will function satisfactorily in the mud compositions of this invention, although magnesium carbonate is preferred. Other magnesium compounds which may be used include the magnesium salts of weak non-fatty acids, such as magnesium acetate, magnesium benzoate, magnesium orthoborate, magnesium ferrocyanide, magnesium formate, magnesium oxalate, and magnesium tartrate. The magnesium compound which is used must either be basic or partially hydrolyze to become basic in aqueous solution. Magnesium salts of long chain fatty acids are excluded since the use of these salts results in emulsion inversion, i.e., the formation of a water-in-oil emulsion. The amount of the magnesium compound used is preferably within the range previously indicated and is sufficient to yield enough magnesium ions to suppress, by mass action, the decomposition of the attapulgite clay mud at elevated temperatures. Compounds which are difficultly soluble or slightly ionized in water are preferred since a substantial reserve of the solid magnesium compound is maintained in the drilling mud for use over an extended period of time. After the drilling mud is prepared as described above, a small amount of oil, viz., 5 to 25% by volume of the water, and preferably about 10% by volume, is added to the mud and mixed therewith to form an oil-in-water-emulsion. Mud which is prepared in this manner has low water loss properties, as measured in accordance with API Code #29, and is very stable at elevated temperatures, e.g., 350°–400° F. and higher.

The following non-limiting examples are illustrative of the scope of this invention.

*Example I*

An attapulgite clay mud was prepared by slurrying attapulgite clay in water at a concentration of 24 pounds per barrel, together with 5 pounds per barrel sodium hydroxide, and 2 pounds per barrel calcium lignosulfonate. This mud was very fluid and could be pumped readily. However, when the water loss was measured in accordance with API Code #29, it was found to be in excess of 100 ml. per 30 minutes. This water loss is far in excess of the maximum permissible for a drilling mud.

*Example II*

A drilling mud was prepared having the same composition as that in Example I except that starch was added in a concentration of 4 pounds per barrel. This drilling mud had an initial water loss of about 10 ml. per 30 minutes, when measured in accordance with API Code #29. A sample of this drilling mud was heated to 350° F. for a period of 24 hours and then retested for water loss. The water loss characteristics of the mud were found to have degenerated substantially and the mud had a water loss in excess of 100 ml. per 30 minutes.

*Example III*

A drilling mud composition was prepared by slurrying 24 pounds per barrel attapulgite clay in water containing 5 pounds per barrel sodium hydroxide, 2 pounds per barrel calcium lignosulfonate, and 4 pounds per barrel crude dextran. This drilling mud had satisfactory water loss properties at moderate temperatures. However, when this drilling mud was heated to 350°–400° F. for a period of 24 hours and retested, it was found that the water loss had increased to a value in excess of 100 ml. per 30 minutes.

*Example IV*

Several mud samples were prepared by slurrying attapulgite clay in water at a concentration of 24 pounds per barrel together with 2 pounds per barrel calcium lignosulfonate as dispersing agent, 5 pounds per barrel sodium hydroxide, 10 pounds per barrel magnesium carbonate, and 2 to 6 pounds per barrel crude dextran. The muds were thoroughly mixed and 10% v. (based on the water) of diesel oil was added. Three samples, containing 2, 4, and 6 pounds per barrel dextran, respectively, were evaluated for water loss at room temperature and after heating for 24 hours at 350° F. Each of the mud samples had an API water loss of less than 10 ml. per 30 minutes when measured at room temperature. After "aging" for 24 hours at 350° F., the mud containing 6 pounds per barrel dextran had a water loss of 11 ml. per 30 minutes. The sample containing 4 pounds per barrel dextran had a water loss of 19 ml. per 30 minutes. The sample containing 2 pounds per barrel dextran had a water loss of 20 ml. per 30 minutes.

When magnesium hydroxide or margnesium acetate is substituted for the magnesium carbonate in the above mud compositions, the water loss values are substantially the same as when the magnesium carbonate is used. It appears therefore that the mud compositions of this invention require basic magnesium compounds, e.g., magnesium oxide or magnesium hydroxide or magnesium salts of weak acids, which yield a sufficient concentration of magnesium ions to suppress the decomposition of the attapulgite clay at elevated temperatures. When starch is substituted for the dextran in the above compositions, the resulting muds have satisfactory water loss properties at moderate temperatures. However, the exposure of the starch-containing mud to 350°–400° F. for 24 hours results in a slight degradation of the starch. Thus, an attapulgite clay mud containing 4 pounds per barrel starch, after heating for 24 hours at 350° F., has a water loss value of 45 ml. per 30 minutes, as compared to less than 10 ml. per 30 minutes prior to heating. Even so, the starch-containing mud composition is substantially more stable in the presence of dissolved magnesium ions than is a starch-containing mud containing no magnesium compound.

*Example V*

A drilling mud was prepared having the composition set forth in Example IV except that the oil was omitted and the mud therefore had a water base rather than an oil-in-water emulsion base. This mud was buffered and stabilized by the magnesium carbonate at moderate temperatures and had a water loss of less than 10 ml. per 30 minutes. However, when this mud was heated to 350° F. for a 24 hour period, the water loss degenerated to a value in excess of 30 ml. per 30 minutes. It would appear therefore that the formation of an oil-in-water emulsion base for the attapulgite clay drilling mud is essential to the formulation of any high temperature resistant attapulgite mud system. The oil droplets in the emulsion apparently aid in lowering filtration rates by plugging holes between the clay particles and also protect the clay against decomposition by adsorption of oil droplets on the particle surfaces.

*Example VI*

An attapulgite clay drilling mud was prepared in accordance with Example IV, except that magnesium chloride was substituted for the carbonate in the mud composition. The mud was heated for 24 hours at 350° F. and then measured and found to have a water loss value of 60 ml. per 30 minutes. Additional experimental work has shown that other magnesium salts of strong acids, e.g., magnesium sulfate, are ineffective in producing satisfactory mud compositions in accordance with this invention. Mud compositions which are prepared using the magnesium salts of strong acids have water losses at least three times as great as the muds which are based on magnesium carbonate. Drilling muds which are prepared using magnesium sulfate or magnesium chloride were also treated with additional quantities of sodium hydroxide to raise the pH to compensate for a lowering of the pH resulting from partial hydrolysis of the magnesium compound. Samples which were prepared in this manner were not improved in water loss values.

While I have described my invention fully and completely with special emphasis upon several preferred embodiments thereof, as required by the patent laws, I wish it to be understood that within the scope of the appended claims this invention may be practiced otherwise than as specifically described herein.

What is claimed is:

1. An oil-emulsion base, attapulgite clay, drilling mud for use at high temperatures comprising an alkaline oil-in-water emulsion phase, an attapulgite clay dispersed in said emulsion phase and a dispersing agent for said clay, a small amount of a high molecular weight, non-ionic, polysaccharide sufficient to restrict water loss to a value less than 30 ml. per 30 minutes measured in accordance with API Code #29, said polysaccharide having a molecular weight in excess of about 50,000 and being water soluble and a magnesium compound selected from the group consisting of magnesium oxide, magnesium hydroxide, and magnesium carbonate in an amount sufficient to inhibit decomposition of the clay at elevated temperatures.

2. A drilling mud in accordance with claim 1 in which the polysaccharide is selected from the group consisting of dextran, starch, and water soluble cellulose ethers.

3. A drilling mud in accordance with claim 1 in which the polysaccharide is dextran.

4. A drilling mud in accordance with claim 1 in which the dispersing agent is selected from the group consisting of lignosulfonates, quebracho, tannin, lignins, lignin derivatives, and lignite derivatives.

5. A drilling mud in accordance with claim 4 in which the magnesium compound is magnesium oxide.

6. An oil-emulsion base, attapulgite clay, drilling mud for use at high temperatures comprising an alkaline oil-in-water emulsion phase, an attapulgite clay dispersed in said emulsion phase and a dispersing agent for said clay, a small amount of a high molecular weight, non-ionic, polysaccharide sufficient to restrict water loss to a value less than 30 ml. per 30 minutes measured in accordance with API Code #29, said polysaccharide having a molecular weight in excess of about 50,000 and being water soluble and magnesium carbonate in an amount sufficient to inhibit decomposition of the clay at elevated temperatures.

7. A drilling mud in accordance with claim 6 in which the polysaccharide is selected from the group consisting of dextran, starch, and water soluble cellulose ethers.

8. An oil-emulsion base, attapulgite clay, drilling mud for use at high temperatures consisting essentially of:

| | |
|---|---|
| Water. | |
| Oil (emulsified in the water) | 5–25% v. |
| Attapulgite clay | 10–30 lbs./bbl |
| Alkali | 1–10 lbs./bbl. |
| High molecular weight, non-ionic, polysaccharide, having a molecular weight in excess of about 50,000 and being water soluble | 0.5–8 lbs./bbl |
| Dispersing agent | 1–3 lbs./bbl. |
| Magnesium compound selected from the group consisting of magnesium oxide, magnesium hydroxide, and magnesium carbonate | 5–20 lbs./bbl. |

9. A drilling mud in accordance with claim 8 in which the polysaccharide is selected from the group consisting of dextran, starch, and water soluble cellulose ethers.

10. An oil-emulsion base, attapulgite clay, drilling mud for use at high temperatures consisting essentially of:

| | |
|---|---|
| Water. | |
| Oil (emulsified in the water) | 5–25% v. |
| Attapulgite clay | 10–30 lbs./bbl |
| Sodium hydroxide | 1–10 lbs./bbl. |
| Dextran | 0.5–8 lbs./bbl |
| Calcium lignosulfonate | 1–3 lbs./bbl. |
| Magnesium carbonate | 5–20 lbs./bbl. |

11. An oil-emulsion base, attapulgite clay, drilling mud for use at high temperatures consisting essentially of:

| | |
|---|---|
| Water. | |
| Oil (emulsified in the water) | 10% v. |
| Attapulgite clay | 18–25 lbs./bbl |
| Alkali | 3–7 lbs./bbl. |
| High molecular weight, non-ionic, polysaccharide, having a molecular weight in excess of about 50,000 and being water soluble | 2–4 lbs./bbl. |
| Dispersing agent | 1–3 lbs./bbl. |
| Magnesium compound selected from the group consisting of magnesium oxide, magnesium hydroxide, and magnesium carbonate | 8–12 lbs./bbl. |

12. A drilling mud in accordance with claim 11 in which the polysaccharide is selected from the group consisting of dextran, starch, and water soluble cellulose ethers.

References Cited in the file of this patent

UNITED STATES PATENTS

| | | |
|---|---|---|
| 2,360,327 | Bailey et al. | Oct. 17, 1944 |
| 2,399,986 | Chapman | May 7, 1946 |
| 2,789,949 | Scotty | Apr. 23, 1957 |
| 2,800,449 | Browning | July 23, 1957 |
| 2,828,258 | Thompson | Mar. 25, 1958 |
| 2,856,356 | Weiss et al. | Oct. 14, 1958 |

OTHER REFERENCES

Rogers: Composition and Properties of Oil Well Drilling Fluids, pub. 1953 by Gulf Publ. Co. of Houston, Texas, rev. ed., pp. 222 and 223.

Larsen: Use of Clay in Drilling Fluids, article in Clay and Clay Technology, Bulletin 169, pub. 1955, by Div. of Mines, Ferry Building, San Francisco, page 275.

UNITED STATES PATENT OFFICE
CERTIFICATE OF CORRECTION

Patent No. 3,046,221            July 24, 1962

Charles G. Dodd

It is hereby certified that error appears in the above numbered patent requiring correction and that the said Letters Patent should read as corrected below.

Column 1, lines 68 and 69, for "additive, attapulgit clay salt water muds ditives" read -- properties by inclusion of low-water-loss additives, --.

Signed and sealed this 1st day of January 1963.

(SEAL)
Attest:

ERNEST W. SWIDER
Attesting Officer

DAVID L. LADD
Commissioner of Patents